Patented June 1, 1926.

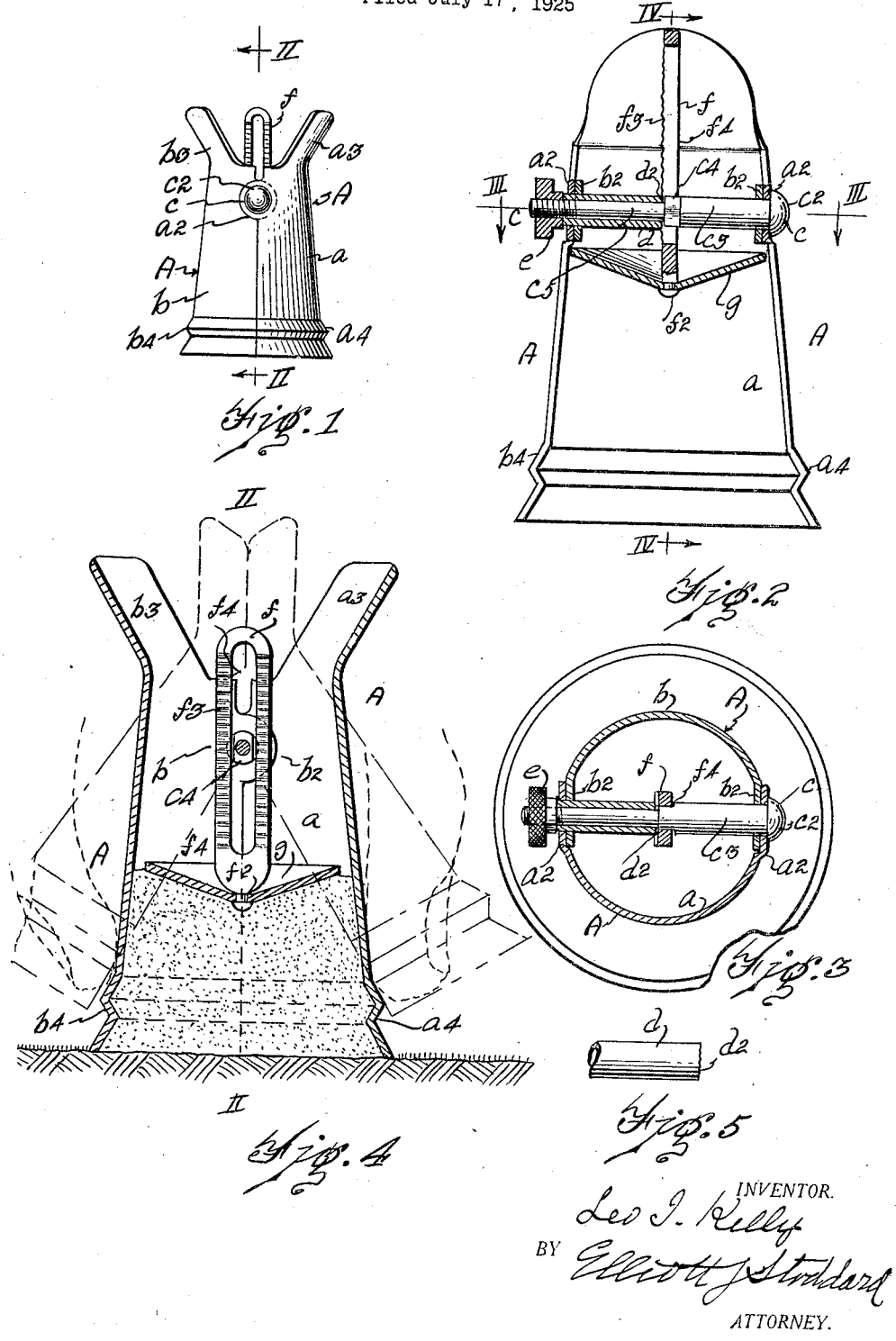

1,587,160

UNITED STATES PATENT OFFICE.

LEO I. KELLY, OF DETROIT, MICHIGAN.

INSTRUMENT FOR FORMING TEES.

Application filed July 17, 1925. Serial No. 44,200.

My invention relates to an instrument for forming tees for golf balls and an object of my improvements is to provide an instrument that is cheap to make, convenient to assemble and that shall form a tee of a required dimension readily and without failure.

I secure this object in the device illustrated in the accompanying drawing, in which—

Figure 1, is an elevation of an instrument embodying my invention.

Figure 2, is a section of the same to an enlarged scale on the line 2—2 of Figures 1 and 4.

Figure 3, is a section on the line 3—3 of Figure 2.

Figure 4, is a section on the line 4—4 of Figure 2.

Figure 5, is a sectional view of a sleeve used in the construction separate from the other parts.

A, A, is a bell-shaped, or conical casing adapted to serve as a mold for sand to form the tee. Said casing is made up of two parts $a$ and $b$, the edges of which meet in a vertical plane to form the casing. The part $a$ is provided with lugs $a^2$, $a^2$, and the part $b$ with lugs $b^2$, $b^2$; these lugs have apertures through them which fit over a pivot $c$ to pivot the parts $a$ and $b$ together toward their upper ends. $a^3$, and $b^3$ are handles by which the parts $a$ and $b$ may be turned about their pivot $c$.

$f$, is a yoke extending vertically in the axis of the casing A; this yoke has a slot $f^4$ extending throughout the larger part of its length. $g$, is a plate shaped to present a conical surface downward, the lower end of the yoke $f$ is riveted at $f^2$ to the plate $g$.

The pivot $c$ consists of a rod or pin having a head $c^2$ and a larger cylindrical portion $c^3$ extending inward from the head $c^2$ to near the center of the casing. At this point, the cylindrical portion $c^3$ is milled out at its sides so as to present a part $c^4$ that shall fit into but not turn in the slot $f^4$ of the yoke $f$. The shoulders formed by milling away the inner end of the cylindrical parts $c^3$ at the sides engage against the side surface of the yoke $f$ and the milled away portion extends only part way through the slot $f^4$.

The rod $c$ then extends in a cylindrical part $c^5$ which is small enough in diameter to pass through the slot $f$. The part $c^5$ is co-axial with the part $c^3$ and is screw-threaded at its outer end and extends beyond the wall of the casing in the screw threaded portion.

$d$, is a sleeve that passes over the part $c^5$ of the pin $c$; its inner end being scalloped or roughened, as shown most distinctly in Figure 5, for a purpose hereinafter described. The sleeve $d$ engages at its inner end against a surface of the yoke $f$ and extends through the wall of the casing at its outer end. $e$, is a thumb nut, the threads of which engage the threads upon the part $c^5$ of the pin $c$. The scalloped or roughened inner end of the sleeve $d$ engages the roughened surface of the yoke $f$ and is held firmly in engagement therewith by the screwed up nut $e$, thus fixing the yoke and preventing its vertical movement.

The lugs $a^2$, $b^2$, fit over the cylindrical portion $c^3$ of the pin $c$ upon one side of the casing and over the sleeve $d$ upon the other side of the casing.

The parts may be assembled as follows:

The parts $a$, $b$ and $f$ are placed in their proper relative position and the pin $c$ is passed through the lugs $a$ and $b$ on one side of the casing thus formed, the chamfered-off portion $c^4$ engaging in the slot $f^4$ and the parts $c^5$ passing through the lugs upon the opposite side of the casing. The sleeve $d$ is then placed over the part $c^5$, its inner end engaging against the roughened surface $f^3$ of the yoke $f$. The nut $e$ is then screwed into place and the parts are assembled.

The height of the tee formed will be the distance between the lower surfaces of the plate $g$ and the lower end of the casing A. This height may be adjusted by loosening the nut $e$ and moving the plate $g$ up or down by means of the yoke $f$ and again tightening the nut $e$ to secure the plate $g$ in the desired position in which it has been placed.

The method of using the instrument is as follows:

The parts $a$ and $b$ may be separated by rotating about the pin $c$ and their lower ends forced into the sand and forced together by the fingers engaging against the outer surface of the groove or annular enlargement $a^4$, $b^4$, and the ends of these parts then pressed together when the sand will fill the lower part of the casing, as shown in Figure 4, the top being molded into a concave conical form by the plate $g$ and extending into the concave portion of the groove or annular projection $a^4$, $b^4$. In this way, the instrument with the sand intact may be carried to the place desired without danger of the sand falling out; the casing will be placed with its lower end upon the surface where the tee is desired, the parts $a$ and $b$ again turned about the pin $c$ by pressing inward on the handles $a^3$, $b^3$, and the instrument removed leaving the tee intact and ready for use.

What I claim is:—

1. The combination of two parts of a mould casing, a pin $c$ passing through the upper portion of said parts to pivot the same, a yoke $f$ having a longitudinal slot therein, a plate $g$ in said casing adapted to form the top of a tee secured to the lower end of said yoke, said pin passing through said slot so as to permit the vertical movement of said yoke, and means for securing said yoke immovably to said pin.

2. The combination of two parts of a mould casing, a pin $c$ passing through the upper portion of said parts to pivot the same, a yoke $f$ having a longitudinal slot therein, a plate $g$ in said casing adapted to form the top of a tee secured to the lower end of said yoke, said pin passing through said slot so as to permit the vertical movement of said yoke, and means for securing said yoke immovably to said pin, said pin consisting of a larger portion $c^3$ having its end engaging against the surface of said yoke, said pin extending in a smaller portion through said yoke, and a sleeve engaging over said smaller portion of the pin, its inner end engaging against the other surface of said yoke, and means for forcing the inner end of said sleeve against said surface that it engages.

3. The combination of two parts of a mould casing, a pin $c$ passing through the upper portion of said parts to pivot the same, a yoke $f$ having a longitudinal slot therein, a plate $g$ in said casing adapted to form the top of a tee secured to the lower end of said yoke, said pin passing through said slot so as to permit the vertical movement of said yoke, and means for securing said yoke immovably to said pin, said pin consisting of a larger portion $c^3$ having its end engaging against the surface of said yoke, said pin extending in a smaller portion through said yoke, and a sleeve engaging over said smaller portion of the pin, its inner end engaging against the other surface of said yoke, and means for forcing the inner end of said sleeve against said surface that it engages, said pin engaging in said slot so as to prevent the relative rotation of said yoke and pin.

4. The combination of two parts $a$ and $b$ forming a casing, a pin $c$ passing through the upper portions of said parts to pivot the same together, a plate $g$ adapted to form the upper part of the tee and adjustable longitudinally in said casing, and means secured to said plate and adjustably secured to said pin for holding and positioning said plate in said casing.

In testimony whereof, I sign this specification.

LEO I. KELLY.